United States Patent [19]

Thompson

[11] Patent Number: 4,628,440

[45] Date of Patent: Dec. 9, 1986

[54] ELECTRICAL APPLIANCE CONTROL

[75] Inventor: David R. Thompson, Fife, Scotland

[73] Assignee: Pico Electronics Limited, Scotland

[21] Appl. No.: 796,531

[22] Filed: Nov. 12, 1985

Related U.S. Application Data

[63] Continuation of Ser. No. 436,647, Oct. 25, 1982, abandoned.

[30] Foreign Application Priority Data

Oct. 26, 1981 [GB] United Kingdom ................. 8132173

[51] Int. Cl.$^4$ .................... G05B 11/01; H04M 11/04; H01N 9/26
[52] U.S. Cl. ............................... 364/140; 340/310 A; 340/310 CP; 200/5 A
[58] Field of Search ........ 340/310 A, 310 CP, 825.52, 340/825.56, 825.68, 825.76; 364/200, 900, 140, 141, 144, 146; 307/7, 155; 200/5 A

[56] References Cited

U.S. PATENT DOCUMENTS

| | | |
|---|---|---|
| 3,810,096 | 5/1974 | Kabat et al. .................. 340/310 CP |
| 3,818,481 | 6/1974 | Dorfman et al. ............. 340/310 CP |
| 3,959,610 | 5/1976 | Finnegan et al. .................. 200/5 A |
| 4,131,882 | 12/1978 | Hollabaugh et al. ........... 340/310 A |
| 4,162,486 | 7/1979 | Wyler ............................... 340/31 A |
| 4,200,862 | 4/1980 | Campbell et al. ......... 340/310 CP X |
| 4,328,482 | 5/1982 | Belcher et al. ........... 340/310 CP X |
| 4,418,333 | 11/1983 | Schwarzbach et al. .......... 364/10 A |
| 4,524,288 | 6/1985 | Schimmelpennink et al. ..... 340/310 A |
| 4,540,890 | 9/1985 | Gangemi et al. ................ 340/310 A |

FOREIGN PATENT DOCUMENTS 2495396 6/1982 France.
2053539 8/1982 United Kingdom.

Primary Examiner—Jerry Smith
Assistant Examiner—Jon D. Grossman
Attorney, Agent, or Firm—Murray and Whisenhunt

[57] ABSTRACT

A transmitter, for electrical appliance control by transmitting digital control signals on a power main, comprises two releasably connected parts, a first part comprising m actuators to initiate the generation of m control signals, and the second part containing a generator for the control signals, and a selector for selecting m out of n control signals. The selector is hidden by the first part when the parts are joined together and may be adjusted to select different groups of m control signals from the n possible signals. All n control signals can be produced, in groups of up to m signals for each condition of the selector. A monitor is also provided to monitor the main in order to achieve transmitter queueing dependent upon the selector settings at the transmitters.

27 Claims, 6 Drawing Figures

ELECTRICAL APPLIANCE CONTROL

This application is a continuation of Ser. No. 436,647, filed Oct. 25, 1982, now abandoned.

BACKGROUND OF THE INVENTION

This invention relates to electrical appliance control and particularly concerns a transmitter or controller for the remote control of slave units.

U.K. Pat. No. 1592971 discloses a remote control system for electrical appliances. That system comprises a power main having a plurality of power outlets, at least one slave unit having a power input coupled to the main and operable to control the supply of power to an appliance, and a transmitter for controlling the or each slave unit, the transmitter comprising: means for generating selectively digital instruction signals at least some of which contain an address of a slave unit; and means for modulating said digital signal onto the power main, and the or each slave unit comprising: means for defining the address of that unit; means for receiving the digital signal from the main and means for responding to that signal when the address of the defining means and any address contained in the digital signal have a predetermined correspondence.

Such a system will hereinafter be referred to as a "system as herein defined".

Preferably the address in such a system includes an area code or address defining an area, building or home in which the system is to operate.

In one practical form, the system has various types of transmitters such as command consoles, timers and computer interfaces all of which are designed to transmit a digitally encoded 120 KHz signal onto a domestic or other power line. This signal is received by various types of slave units (receivers) such as lamp dimmers, wall switch dimmers and appliance modules which can then turn on or off appliances and dim or brighten lamps upon receipt of the appropriate code from a transmitter. All types of transmitters send the same code format so that a receiver will respond to codes from any type of transmitter in the system. A control system for a vehicle is disclosed in U.K. specification No. 1607816 (Belgian Specification No. 874722) and which uses digital control signals containing addresses. However, the power supply and signal path are distinct, although in one cable, so this system is not applicable directly to a domestic control system as disclosed in U.K. Specification No. 1592971. Each transmitter is preset to communicate only with selected local processing units.

An object of the present invention is to provide a transmitter (or controller) which can be designed for controlling the same types of receiver as do the transmitters described in the above-mentioned Patent and which has improved facilities.

SUMMARY OF THE INVENTION

According to one aspect of the invention, there is provided a transmitter for controlling n slave units by means of a digital control signal containing an address for at least one of the n slave units, the transmitter comprising m ($<n$) actuators by which the generation of said digital control signal can be initiated for m of the n slave units, and selector means settable to any one of a plurality of conditions for selectively altering the addresses corresponding to the m actuators, whereby all n slave units can be controlled by one transmitter in groups of up to m slave units for each condition of the selector means. This obviates the need to provide a large keyboard to be able to select a large number, say 16, of addresses and to select a function for that address.

In one example, the transmitter is capable of generating sixteen ($n=16$) addresses but needs only four ($m=4$) actuators. The selector means might then have at least four ($n/m$), and preferably twelve ($n-m$) or sixteen ($n$) different conditions in which it can be set.

According to a second aspect of the invention, there is provided a transmitter for controlling at least m slave units by means of digital control signals at least some of which contain an address for at least one slave unit, the transmitter comprising two releasably connected parts, a first part comprising m actuators and the second part comprising digital control signal generating means responsive to the operation of the actuators for generating said digital control signal with a form depending upon which of the m actuators has been operated.

One possibility is then that the first part may be removed and replaced by another first part with different actuators. Means may be provided in the second part to respond to the type of first part which has been connected, thereby to generate digital control signals that depend upon the type of first part.

In addition or alternatively the second part may include selector means for selectively altering the functioning of the transmitter, the selector means being hidden by the first part in normal use but being accessible when the first part is removed. The selector means may be as described above for the first aspect of the invention, Additionally or alternatively the selector means may comprise means for selecting an area code to be incorporated into the control signal for activating only slave units able to recognise that area code.

In a preferred embodiment according to both of the above aspects of the invention, the first part is a plug-in module having m actuators and conceals, when plugged in, a switch for selecting an area code and a switch for selecting different groups of m slave units; the second part is designed to respond to a first part having either m on/off actuators or m−1 on/off actuators and a further actuator for brightness control or for on/off control of a group of lamps.

According to a third aspect of the invention, there is provided a transmitter for controlling at least m slave units by means of a digital control signal containing an address for at least one of the slave units and a command for the associated slave unit, the transmitter comprising m actuators by which the generation of said digital control signal can be initiated for at least m slave units, storage means for storing actuations of the actuators, and digital control signal generating means for generating from the storage means a digital control signal comprising the addresses of all slave units for which a given command has been entered by the actuators in combination with the given command.

Thus, instead of issuing a sequence of signals comprising 'address', 'command', 'address', 'command' etc., one may issue, for example, a control signal consisting of 'address', 'address', 'address', command', whereby a single command may by applied to several 'addresses' and so save transmission time. The storage means preferably organises actuator operations into 'ON' and 'OFF' groups, so that, from a plurality of simultaneous or near simultaneous actuations, two control signals can be produced, one for switching on a group of appliances and the other for switching off a group of appliances. This also allows for group dimming or brightening.

According to a fourth aspect of the invention, there is provided a transmitter for controlling slave units by means of a digital control signal transmitted onto a power main, the transmitter comprising means for monitoring the power main for digital signals and noise for delaying transmission of a control signal onto the main until the monitoring means has detected that the main has been substantially free for a given time of a signal or of noise of a given property.

For example, the given time may be eight half cycles. The given property is preferably a frequency within a frequency range, e.g. a frequency of at least a given value which may be detected as the existence of more than a given number of cycles within a given time slot or slots in a half-cycle of the mains. The given slot or slots is or are to be chosen to coincide with possible transmission time, e.g. a one millisecond slot three times each half-cycle corresponding approximately to the zero-crossings of each phase of a 3-phase system.

The design of the circuit is therefore preferably such that no two transmitters will try to engage the main together. In the above example, each transmitter continually monitors the line for signals(or noise) and will not transmit until the main has been free for eight mains half cycles. Also, in the preferred embodiment, all transmitters waiting to engage the line will not try to do so together. All transmitters in such a system are synchronised by any data on the line and the "Priority" of each transmitter is set by the above-mentioned address selector switch such that no transmitter will engage the line until it is its "turn". The effect is intended so that transmitters on the same phase will not interfere provided the selector switch settings are different, and even if two transmitters have the same setting, they will not interfere if they are on different phases. However, once a transmitter has engaged the main, it bypasses signals without having to re-engage the main each time, (unless data is keyed in at a rate slower than the transmission rate).

According to a fifth aspect of the invention, there is provided a transmitter for controlling a slave unit by means of a digital control signal defining commands, the transmitter comprising an actuator by which the generation of the digital control signal is initiated and means for selecting one or the other of two alternative responses to actuator operation, one response being to issue a digital control signal defining a command on operation of the actuator and the other response being to issue digital control signals defining different commands on the leading and trailing edges of an actuator operation. This allows momentary On Control, i.e. a slave will turn on when a key is pressed and turn off when the key is released. Alternatively, momentary Off Control may be achieved, i.e. a slave unit will turn Off when a key is pressed and turn ON again when the key is released. These features are particularly useful when operating the transmitter from remote sensors. For example a transmitter may send a code to turn on a heater when a thermostat input to the transmitter closes and then send the code to turn off the heater when the termostate opens. Or a transmitter may send the code "All Lights On" when a contact is closed by a photodetector and then "All Lights Off" when the contact opens (or vice versa).

According to a sixth aspect of the invention, there is provided a transmitter for controlling slave units by means of digital control signals emitted onto a power main, the transmitter having a transmission option selectable either to emit a digital control signal in three bursts within a half-cycle of the main (to couple with all phases of a three-phase system), or to emit a digital control signal in a burst existing for substantially the whole of one half-cycle of the main.

A system sending three, e.g. one millisecond, bursts will operate slave units on all three phases in a 3-Phase system, (the bursts coinciding with or occurring close to the zero crossings of respective phases). It can be shown, however, that there is a 30 degree phase change between 120 V and 277 V systems in the U.S.A. Therefore, if three one millisecond bursts are transmitted on a 120 V line and it is required to operate receivers on a 277 V line (for example 277 V fluorescent lighting), none of the three bursts will overlap the zero crossing of the 277 V line. If however the second option is selected, the transmission lasts substantially the whole half cycle and therefore allows 277 V slave units to be operated from 120 V transmitters.

A further option sends a control signal only once. This cuts down transmission time and therefore reduces the time that other transmitters have to "Queue" to send data. In a high noise environment however, another option may be selected to send the data twice, to increase the chance of receiving a valid code.

BRIEF DESCRIPTION OF THE DRAWINGS

For a better understanding of the invention, and to show how the same may be carried into effect, reference will now be made, by way of example, to the accompanying drawings, in which.

DESCRIPTION OF A PREFERRED EMBODIMENT

Figure 1:
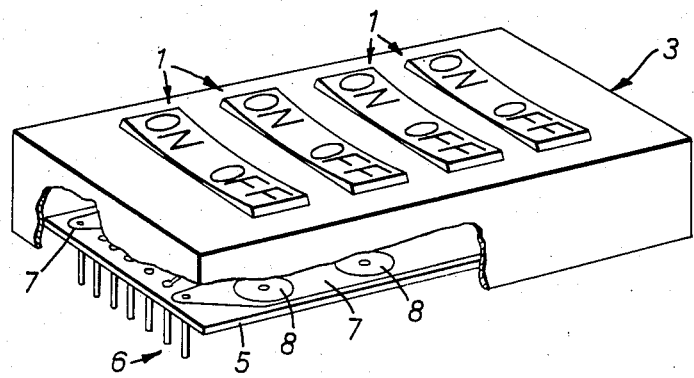
FIG. 1 is a perspective and partially cut-away view of a plug-in keyboard for an appliance control transmitter.

One practical form of the transmitter or controller discussed in UK Patent No. 1592971 is designed to control up to sixteen receiver modules (slave units) by pressing any of the sixteen number (or address) keys, to create a number (address) code, followed by a function key, (e.g. On, Off, Bright and Dim)to create a function The transmitter described hereinbelow and shown in FIGS. 1 and 2 has four rocker type switches 1 and its circuitry is designed such that pressing one side of a rocker will send a number (address) code, automatically followed by the 'ON' code, and pressing the other side of the rocker will send a number (address) code, automatically followed by the 'OFF' code. Receiver modules can thus be turned 'ON' or 'OFF' with a single key operation, which is a convenience to the user. As shown in the drawings, the transmitter is designed for use on 120 V domestic mains in the United States of America, but can easily be adapted for other circumstances.

The transmitter is extremely compact, being designed to fit into a standard wall outlet, replacing an existing wall switch. For this reason, it only has four "address ON-OFF" rocker switches. It is still possible to control up to sixteen receiver modules, however, as it has a 16-position selector switch 2 (FIG. 2) which allows the user to set which group of receiver modules is to be controlled, i.e. if the selector switch is set in one position, the four rocker switches can turn on and off modules having addresses 1, 2, 3 and 4. If it is set to the next position, the rocker switches will control modules 2, 3, 4 and 5. If set to the fourteenth position, modules 14, 15, 16 and 1 can be controlled, and so on. Thus, any sequence of four successive module addresses can be controlled, the selector switch 2 setting the start address of the sequence. The switches 1 are carried by a keyboard section 3 (FIG. 1) which is plugged into a main body 4 (FIG. 2), several versions of keyboard section being available so as to give options such as Bright-Dim rocker switch, or an All Lights On - All Off rocker switch.

Looking at the keyboard section in more detail it includes a simple printed circuit board from which project eight pins 6. The outer two pins connect to zero and negative power lines respectively within body 4 and to respective sides of the rocker switches. In detail, the outer pins connect to printed circuit strips 7 which extend below the respective sides of the rocker switches and carry domed switching members 8 to be actuated by the rockers to make a connection between one or other of strips 7 and one of four lines associated with respective switches. These four lines are connected to four of the remaining six pins 6, depending upon the function desired for each rocker switch.

Before considering the circuitry of the transmitter various features will be described.

One feature is an option which can be selected to give momentary On or momentary Off control, i.e. a module will turn 'ON' when the key is pressed, and turn 'OFF' when the key is released, or vice versa. This feature is particularly useful when interfacing to a remote sensor when designed to be plugged into the socket 12. which the keyboard section normally plugs into, i.e. it can be arranged that the transmitter sends the code to turn on a heater when a thermostat (which is plugged into the micro-controller) closes and sends the code to turn off the heater when the thermostat opens.

The above-mentioned patent describes transmitters which send a one millisecond burst of data immediately after each zero crossing, for use in a 3-phase circuit. It can be shown, however, that there is a 30° phase difference between 120 V and 208 V and between 120 V and 277 V in the U.S.A. Therefore a one millisecond burst of data coupled from the 120 V line to the 208 V or 277 V line will not overlap the zero crossing of the 208 V or 277 V line. 208 V and 277 V slave units or receivers, therefore, cannot be controlled from existing transmitters without using a repeater/coupler which is designed to receive a signal from the 120 V phases and retransmit it onto the 208 V or 277 V phases, re-timed so as to coincide with the correct zero crossing.

The present embodiment, however, contains an option which allows it to send data over the full half cycle of the mains (instead of a one millisecond burst). The signal will therefore overlap the zero crossing points of the 208 V or 277 V lines. This, therefore, eliminates the need for a repeater in systems which only use such transmitters.

The present embodiment also allows the user to press keys simultaneously and if keys 1-ON, 2-ON, 3-ON, 4-ON were pressed, the digital control signal code actually sent would define:- 1, 2, 3, 4, ON. This cuts down transmission time and allows group dimming. The reason why group dimming is possible is that all receiver modules (slave units) will remain addressed until reset by any number which follows a function or command. Thus, signals:- 1, 2, 3, 4, ON would switch on units 1 to 4 and if that signal is then followed by a command 'DIM', any dimming circuits in units 1 to 4 would operate.

A further feature of this new transmitter is its ability to continuously monitor the power main for digital control signals (or noise) and hold back any transmissions until the main is free. Even if several such transmitters have had keys pressed while another was transmitting, and are therefore waiting to transmit, they will not all try to transmit together. All such transmitters are synchronised by any data on the line, and contain a self polling system (determined by the selector switch 2), so that no two transmitters with different selector switch settings on any one phase will interfere with each other, and even transmitters with the same selector switch setting will not interfere if on different phases.

This self synchronising interrupt facility is an important feature for any control system which has multiple controllers accessing data onto a single wire pair, and has applications outside domestic electrical appliance control systems.

Figure 2:
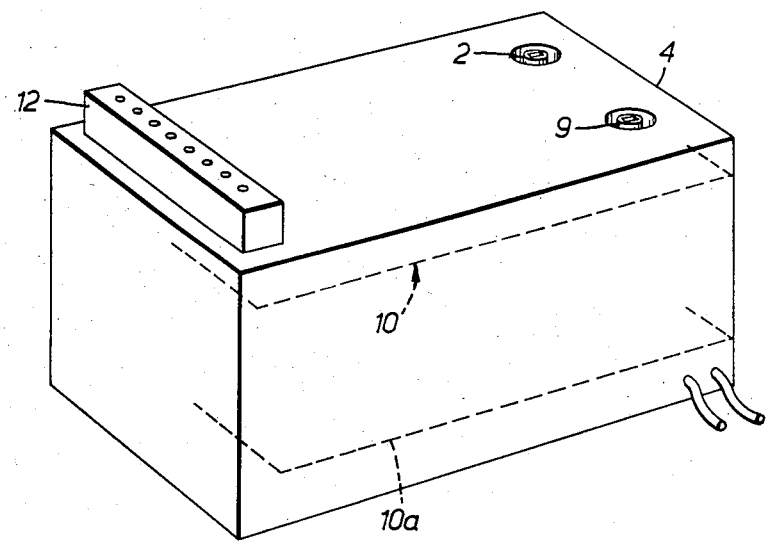
FIG. 2 is a perspective view of the main body of the transmitter.

Returning now to details of construction of the transmitter, FIG. 2 shows that the main body 4 includes a further rotary selector switch 9 by which one can set a specific house code, corresponding to the house code set at the slave units.

Figure 3:
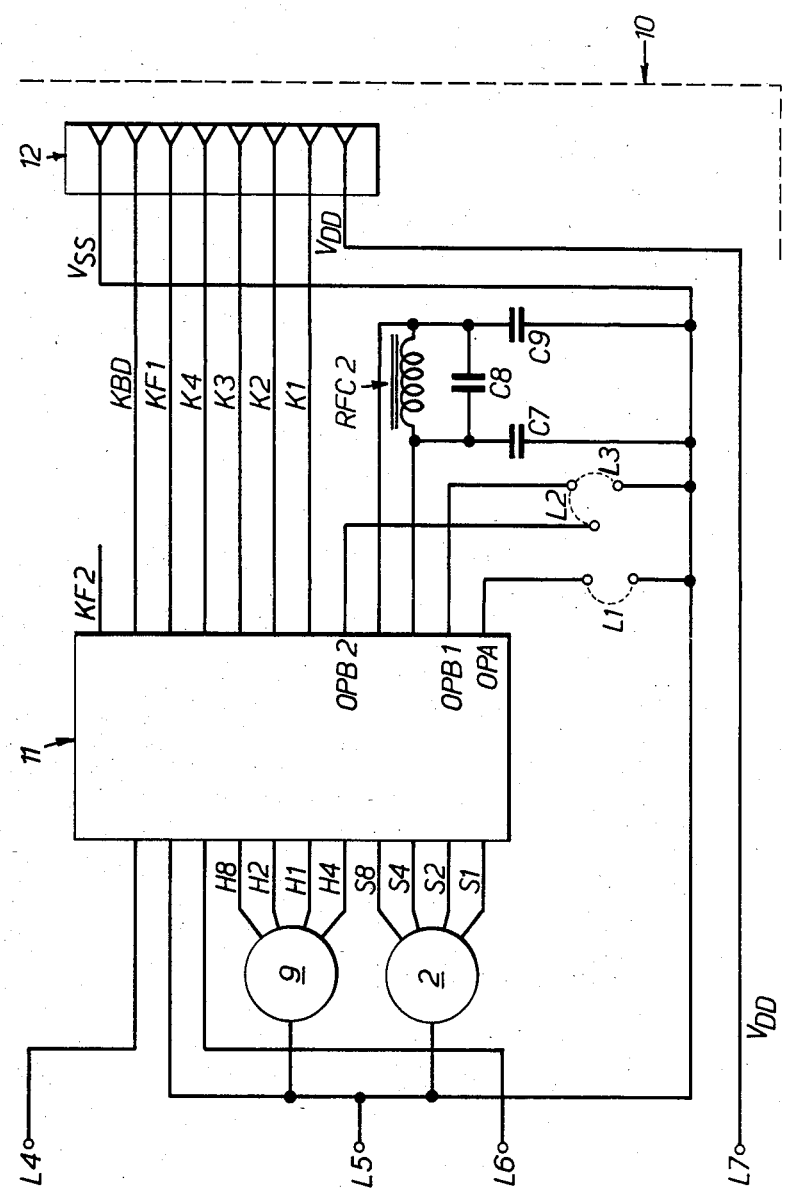
FIG. 3 is a circuit diagram of a first circuit within the main body.
Figure 4:
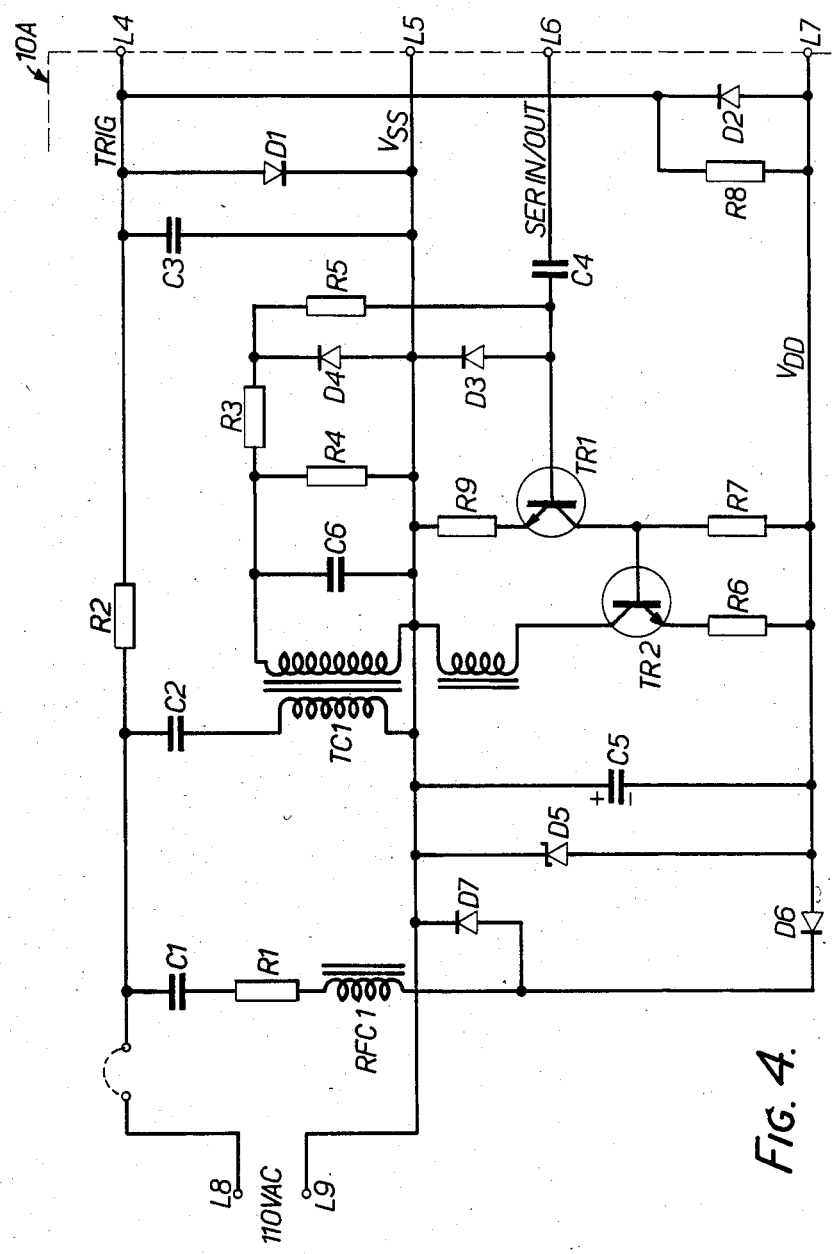
FIG. 4 is a circuit diagram of a second circuit within the main body.

Within the main body 4 are two printed circuit boards 10 and 10a shown in FIGS. 3 and 4.

Figure 5:
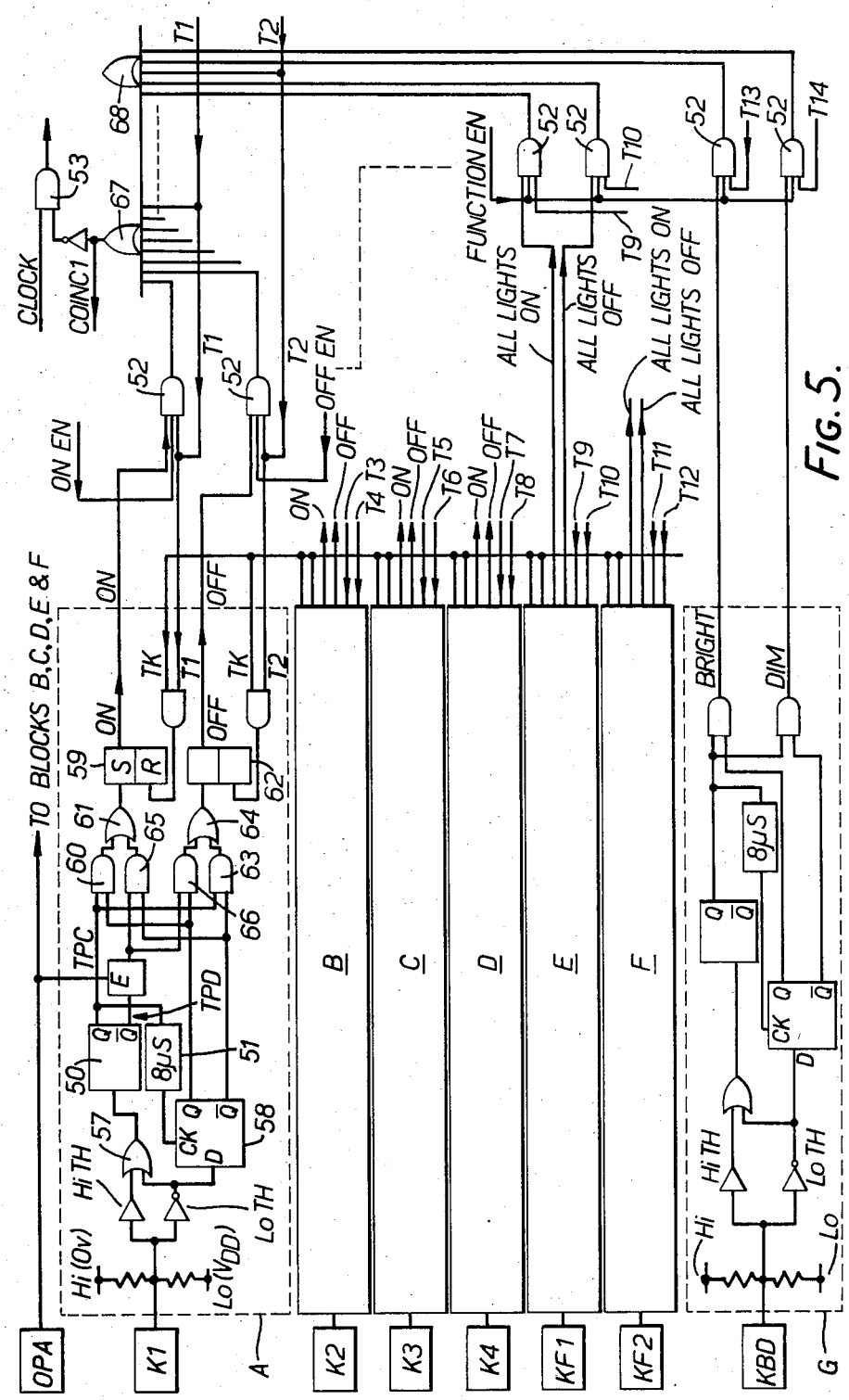
FIGS. 5 and 5a show a block diagram of an integrated circuit within the main body.

The board 10 carriers the fixed contacts of house code and switch code selectors 2 and 9, an eight way connector 12 for pins 6, components C7, C8, C9 and RFC2 for use in generating the 120 KHz carrier and an integrated circuit 11 (shown in FIG. 5). Options mentioned above are selected by links L1, L2 and L3.

The board 10a provides diodes D5, D6 and D7 for creating the supply voltages VDD (-ve) and VSS (Ov) for the circuitry. Also provided are components, including transistors TR1 and TR2 and transformer TC1, for injecting 120 KHz digital control signals from circuit 11 onto the mains and for receiving signals from the mains at L8, L9. From mains line L8 is obtained a voltage TRIG fed to circuit 11 for the detection of mains zero-crossings.

Turning now to FIG. 5, seven key sensing blocks A to G are provided, connected to key connections K1 to K4, KF1, KF2 and KBD. In the example shown in FIG. 3, KF2 is left unconnected and is thus unused in this example, but could be connected so that its block F replaces one other of the blocks. Of the six blocks then available, four are used at any one time, depending upon which keyboard section is plugged into the main body.

Blocks K1 to K4 are all used for entering Number On/Number Off functions, i.e. for issuing codes comprising addresses together with an 'ON' or 'OFF' command. Block K1 is used for entering the ON/OFF command for the first device number in a sequence of four, K2 is used for the second device number and so on for K3 and K4. The blocks A to F are identical, so only block A is shown in detail. Referring to block A, the key connection or input K1 normally sits at a voltage of VDD/2. This voltage is too low to turn on OR gate 57 via its high threshold path HiTh, and too high to turn off the OR gate via its low threshold path LoTh. A switch closure to either supply rail will give a '1' from OR gate 57 which is then debounced by debounce logic 50 and provides a pulse (TPC)—another pulse, TPD is produced when K1 is OPENED, but assume for the moment that input OPA is floating so that TPD is not enabled and will be ignored. 8 μs after TPC, D-type bistable circuit 58 is clocked via delay circuit 51 and if K1 was closed to OV, the output Q of D-type bistable circuit 58 will be a '1'; this will allow TPC to set an 'ON' bistable circuit 59 (via gates 60 and 61). If K1 was closed to VDD, the Q output of circuit 58 would be '0', setting 'OFF' bistable 62 (via gates 63 and 64). Block A therefore recognises a switch closure to OV to represent "1, ON" (i.e. address number 1 and command 'ON')and a switch closure to VDD to represent "1, OFF". Similarly block B recognises a switch closure to OV to represent "2, ON" and a switch closure to VDD to represent "2, OFF". Likewise for blocks C and D (i.e. ON, OFF functions for keys K3 and K4).

Blocks E, F and G are provided to issue commands only, i.e. commands which apply to all, or groups of, slave units designed to respond to those commands (assuming, as always, that the house code associated with the command is the correct one). Block E gives an "All lights on" command for a closure to OV and an "All units off" command for a closure to VDD. Block F gives an "All lights on" command for an OV closure and an "All lights off" command for a VDD closure.

Now, if OPA pin is tied to OV, TPD is enabled and so therefore are gates 65 and 66. This has the effect that the bistable circuit 59 or 62 clocked on opening switch K1, is the opposite so that clocked on closing K1, i.e. if closing K1 to OV represents "1, ON", opening K1 from OV represents "1, OFF". And if closing K1 to VDD represents "1, OFF", opening K1 from VDD represents "1, ON". Similarly blocks B, C and D give momentary 'ON' control when closing and opening K2, K3 or K4 to and from OV, and momentary 'OFF' control when closing and opening K2, K3 or K4 to and from VDD. Block E will signal "All lights on" for closure to OV and "All units off" when KF1 is opened from OV, and "All units off" for closure to VDD and "All lights on" when opened from VDD. Block F will signal "All lights on" when KF2 is closed to OV and "All lights off" when KF2 is opened from OV, and "All lights off" for closure to VDD and "All lights on"0 when opened from VDD.

Input KBD, block 'G' and its associated debounce circuitry signals a closure to OV to provide a 'Bright' command and a closure to VDD to provide a 'Dim' command. This circuitry is unaffected by OPA.

Figure 5A:
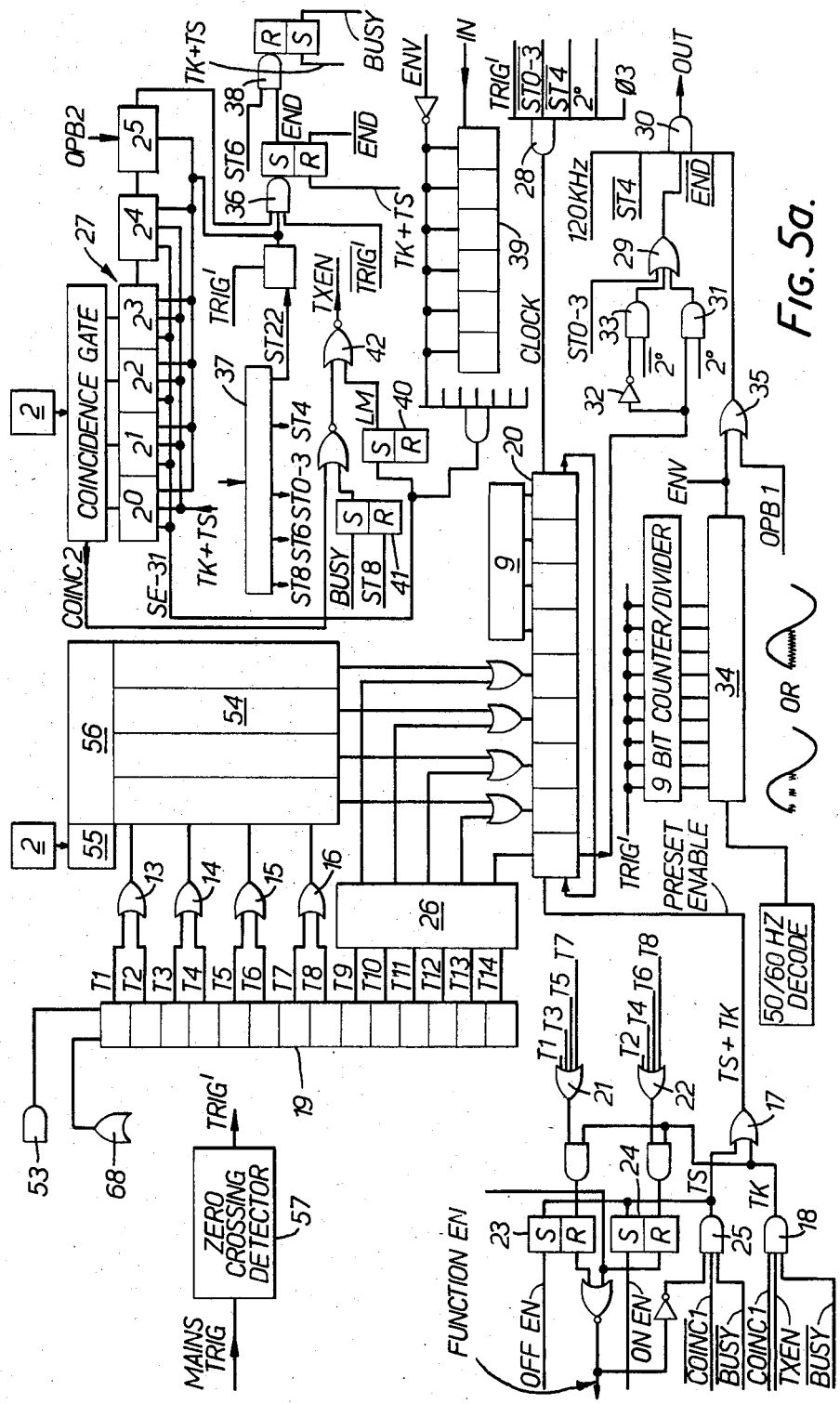

The fourteen possible "number, ON/OFF" outputs and function outputs (All lights on, All units off, All lights off, Bright and Dim), are fed to fourteen (only six shown) 3-input AND gates 52 whose outputs go to a 14-input OR gate 67, which enables gate 53 which passes a clock signal to a 14-bit recirculating shift register 19 (FIG. 5a). This register has a '1' circulating through it, a '1' being fed back into it by gate 68 when all its outputs T1 to T14 are '0'. The outputs of the register serve to enable each 3-input AND gate 52 in turn (looking to see if any key has been pressed). Signals "OFF EN " (Off enable), "ON EN" (On enable), and "FUNCTION EN" (Function enable) are all at '1' at this time, enabling the NAND gates 52. Therefore, if any key is pressed, the output of the gate 67 goes high and stops the clock to the register 19, with one of the outputs T1 to T14 then being a '1'. If one of outputs T1 to T8 (associated with blocks A to D) is a '1'. this is decoded by OR gates 13, 14, 15 and 16, whose outputs address a 1 of 4 block decoder 54. This block decoder 54, together with a 1 of 16 decoder 55 address a 256 bit rom 56. This 1 of 16 decoder is addressed by the 4 bits of the address selector switch 2 of FIG. 2. The outputs of gates 13, 14, 15 and 16 represent K1 ('ON' or 'OFF'), K2('On' or 'Off'), and so on for K3 and K4, and the contents of the 256 bit rom are such that if the selector switch is set to the binary equivalent of decimal 1, the output of the block decoder will be the binary equivalent of decimal 1 for T1 and T2, decimal 2 for T3 and T4, decimal 3 for T5 and T6 and decimal 4 for T7 and T8 (i.e. keys K1 to K4 correspond to numbers 1 to 4). If the selector switch is set to the binary equivalent of decimal 2, then the outputs of the block decoder will correspond to 2, 3, 4 and 5 for T1, T2, T3 and T4 and so on, i.e. the selector switch and the 256 bit rom allow the four input keys to select any of 16 codes in groups of 4 consecutive numbers, dependent on the setting of the selector switch.

If, however, one of the outputs T9 to T14 is a '1' (instead of T1 to T8) this represents a function only ("all lights on", "All lights off", "All units off", "Bright" or "Dim"), and is decoded by a function decoder 26. The outputs of the function decoder are "OR'ed" with the outputs of the block decoder and applied to five of the preset inputs of a 9-stage recirculating shift register 20, (the other four inputs are connected to the house code selector switch). The code representing the key pressed, together with the selected House Code, is loaded into the shift register by a signal (TS+TK) from a gate 17. Gate 18 will generate a TK signal when signal COINC1 from gate 67 is obtained (i.e. a key has been pressed) together with signal BUSY being a '1' (not transmitting) and together with signal TXEN being a '1' (no other transmitter is transmitting). If the key that was pressed was a function (T9 to T14), then this function will be loaded into the 9-bit shift register, TK will reset whichever input logic (blocks A to F) had generated COINC1 and as more than one key may have been pressed, the recirculating register 19 may now continue to look for another coincidence.

If the next coincidence found indicates that a "number, ON/OFF" key was pressed, (T1 to T8), then the number will be loaded into register 20 by TK, and one of the inputs to gates 21 and 22 will be a '1'. If a "Number, ON" key was pressed (T1, T3, T5, T7), gate 21 will reset a bistable circuit 23. This will make "OFF EN" and "FUNCTION EN" a '0'; therefore the recirculating register 19 will only look for further "Number, On" key presses, (keys may be pressed simultaneously so there may be up to four "Number-On" coincidences. Each such number code is shifted into and then out from register 20 in turn and transmitted in the same fashion as described in the above-mentioned patent.

If a "Number, Off" key was pressed, gate 22 will reset bistable circuit 24, so that recirculating register 19 will only look for further "Number-Off" key presses. After transmitting all "Number-On" numbers or all "Number-Off" numbers, it is required to transmit "ON" or "OFF". When bistable 23 or 24 was reset, "FUNCTION EN" went to a '0' and one input of gate 25 went to a '1'; therefore when all numbers have been transmitted ($\overline{COINC1}$ and $\overline{BUSY}$), TS is produced and the function decode block 26 applies either the "ON" or the "OFF" code to register 20 and this is loaded by TS (via gate 17).

It is therefore evident that if keys "1-ON", "2-ON", "3-ON" and "4-ON" are pressed simultaneously (or within 200 milliseconds of each other), the codes actually transmitted will be "1, 2, 3, 4, ON". This cuts down transmission time and allows "Group Dimming" as all four slave units will remain addressed once so activated.

The transmission circuitry has been discussed in the above-mentioned patent. In summary, a state counter 27 controls when the data is shifted out from register 20 (gate 28), i.e. no 'Clock' signal in States 0-3 and State 4 (Start Code Insertion) and no 'Clock' signals in even states, i.e. $\overline{2^\circ}$ (complement data). In States 0-3, 120 HKz is gated to the serial output (gate 29) and in State 4 the output is disabled (gate 30); therefore code 1110 is produced (start code) in States 0 to 4. In Odd states (2°) true data is gated to the output (gate 31) and in even states $\overline{2^\circ}$, complement data is gated through gates 32 and 33. The output signal envelope is generated by a timing decoder 34 with option input OPB1 (at gate 35) selecting either three one millisecond bursts (as with the above-mentioned patent), or one burst encompassing a full half cycle. If option input OPB2 is held at a '1', $\overline{Q32}$ of the state counter 27 will be held at a '1' and as this is applied to bistable circuit 36, at the end of State 22 (decoded by gate 37), END will be set which will stop the transmission (gate 30), i.e. only one complete code is sent. If, however, OPB2 is a '0', the sixth stage of the state counter will have $\overline{Q}$='0' which will prevent END from being set; therefore the whole code will be transmitted again. The second time round, however, the sixth stage of the state counter will have toggled and so END will be set, stopping the transmission. Codes are thus transmitted twice. BUSY is not reset until State 6 (bistable 38) which has the effect of inserting zero's in the first six mains half cycles following the end of a transmission. These options are chosen using links L2 and L3 at tristate input OPB1 and 2 (FIG. 3). With no links, a single message with 3 one millisecond bursts is produced; with link L2, a double transmission is produced with 3 one millisecond bursts; and with link L3, a single message is produced for one half-cycle.

A six stage binary counter 39 monitors the mains during signal envelope time, looking for signals from other transmitters or noise of a frequency which could lock out a transmission. For this purpose the recurrent one millisecond envelope signal ENV is used. A one millisecond burst of signal is recognised by a decode of 63 which sets bistable 40 and removes transmit enable (TXEN) from gate 18 preventing any transmission while a signal from another transmitter is on the line. All transmitters in a system therefore will be prevented from transmitting whilst another transmitter has the line. A decode of 63 means that a signal (or noise) is detected with a frequency of at least 64 KHz. The transmitter which has the line, however, has "BUSY" set, which sets bistable circuit 41 to produce "ENGAGED" and locks out 'DECODE 63' and prevents bistable circuit 40 from being set. At the end of transmission, the state counter 27 will be at State 22. All other transmitters in the system, however, will have had their state counter set to 31 by "DECODE 63". Therefore, on the next state, all transmitters in a system will have their state counters synchronised at State 1. On State 8, bistable 40 is reset taking signal LM to a '0', but if several transmitters had been waiting to transmit it would not be desirable for them all to try to transmit at State 1. Therefore, each transmitter in a system will not get a signal "TXEN" until the output of the state counter coincides with the setting of the selector switch (signal "COINC2"), i.e. at the end of transmission all other transmitters are at State 31. All transmitters are synchronised and when State 8 is reached bistable circuit 40 is re-set on all transmitters. The state counter keeps counting and if on a particular transmitter the selector switch is set to, say, 3, the state counter will count 9, 10, 11, 12, 13, 14, 15,1, 2, 3, at which time "COINC2" will go to a '1', giving a '1' at the output of gate 42 which will produce a TK+TS, resetting the state counter to State 1 and starting the transmission. This transmission will reset all other transmitters to State 31 again, and at the end of this transmission if another transmitter has its selector switch set to say 5, then its state counter will count to State 5 at which time 37 COINC2" will be produced and the transmitter will be able to take the line.

Finally, it is noted that there is a zero crossing detector 157 for producing a signal TRIG' at the mains zero crossings for controlling the timing of various of the functions set out above.

What is claimed is:

1. A transmitter for controlling n slave units by means of a digital control signal containing an area code common to said n slave units, an address for at least one of said n slave units and a command, the transmitter comprising:
   first means for generating an area code;
   second means for generating selectively any one of n addresses for respective ones of said n slave units;
   third means for generating a command;
   m (<n and >1) actuator means coupled to the first, second and third generating means such that a single actuation of one of said m actuator means causes the generation of a digital control signal comprising said area code, an address selected from said n addresses, and said command; and
   address selector means presettable to any one of a plurality of conditions, each of which condition presets a group of m addresses where m is less than n, for defining which addresses constitute said group of m addresses;
   whereby all n slave units, in sequence of operation of said selector means, are controllable by said actuator means of said transmitter in groups of up to m slave units for each condition of the selector means.

2. A transmitter according to claim 1, wherein there are at least n−m different conditions determinable by the selector means for the m actuating means.

3. A transmitter according to claim 1, wherein there are n different conditions determinable by the selector means for the m actuating means.

4. A transmitter according to claim 1 and comprising two releasably connected parts which are a first part, comprising the m actuator means, and a second part comprising said generating means responsive to the operation of the actuating means for generating said digital control signal.

5. A transmitter according to claim 4 wherein said second part includes selector means for selectively altering the functioning of the transmitter, the selector means being hidden by the first part in normal use but being accessible when the first part is removed.

6. A transmitter according to claim 4, wherein the selector means comprises means for selecting said area code to be incorporated into the digital control signal for activating only slave units able to recognise that area code.

7. A transmitter according to claim 6, wherein the first part is a plug-in module having m actuating means and conceals, when plugged in, a switch for selecting an area code and a switch for selecting different groups of slave unit addresses, and the second part is designed to respond to a first part selected from three types of groups of actuating means, for one of which all m actuating means produce a digital control signal of a first type, for a second of which m-1 actuating means produce a control signal of the first type and the mth a control signal of a second type, and for the third of which m-1 actuating means produce a control signal of the first type and the mth a control signal of a third type.

8. A transmitter according to claim 7, and comprising storage means for storing substantially simultaneous actuations of the actuating means, said generating means being coupled to said storage means for generating from the stored actuations said digital control signal in a form which has a portion comprising the addresses of all slave units for which a given command has been entered by the actuating means but excluding the command itself, and a second portion consisting of said given command as a single command.

9. A transmitter according to claim 1, and comprising storage means for storing substantially simultaneous actuations of the actuating means, said generating means being coupled to said storage means for generating from the stored actuations said digital control signal in a form which has a portion comprising the addresses of all slave units for which a given command has been entered by the actuating means but excluding the command itself, and a second portion consisting of said given command as a single command.

10. A transmitter according to claim 9, wherein two different commands can be entered by said actuating means, and comprising means for organising the storage of the actuations in the storage means according to the different commands so as to be operable to produce from a group of actuations two digital control signals one comprising one command with the associated selected addresses and the other comprising the other command with the associated selected addressed.

11. A transmitter according to claim 9, for transmitting said digital control signal onto a power main, the transmitter comprising means for monitoring the power main for digital signals and noise and for delaying its transmission of said control signal onto the main until the monitoring means has detected that the main has been substantially free for a given time or a signal or of noise of a given property.

12. A transmitter according to claim 1, for transmitting said digital control signal onto a power main, the transmitter comprising means for monitoring the power main for digital signals and noise and for delaying its transmission of said control signal onto the main until the monitoring means has detected that the main has been substantially free for a given time of a signal of of noise of a given property.

13. A transmitter according to claim 12, and having means for synchronising the transmitter with others, when in use, for causing the transmitter to transmit at a time corresponding to the setting of its selector means, the synchronising means including means for causing said setting to determine the transmitter's priority to transmit when, in use, several such transmitters are waiting to transmit.

14. A transmitter according to claim 13, wherein said means for causing said setting to determine priority comprises means for including in said given time a time period which is preselected by said selector means and can thus be different from transmitter to transmitter.

15. A transmitter according to claim 13, and comprising means for selecting one or the other of two alternative responses to the operator of one of said actuating means, one response being to issue a digital control signal defining a command on operation of the actuating means and the other response being to issue digital control signals defining different commands on the leading and trailing edges of the operation of said one of said actuating means.

16. A transmitter according to claim 1 and for emitting its digital control signals onto a power main, and comprising:
a transmission option selectable either to emit a digital control signal in three bursts within a half-cycle of the main (to couple with all phases of a three-phase system), or to emit a digital control signal in a burst existing for substantially the whole of one half-cycle of the main.

17. A transmitter for controlling at least m slave units by means of digital control signals at least some of which contain an address for at least one slave unit, the transmitter comprising:
a first part comprising m actuating means and;
a second part releasably connectable to said first part and comprising digital control signal generating means having $x(>m)$ input means so as to be responsive to the operation of x distinct actuating means; and coupling means for coupling said m actuating means to m of said x input means for generating said digital control signal with a form depending upon which of the m actuators has been operated, wherein the first part can be removed and replaced by another first part with m actuating means and with coupling means for coupling to a different m of said x input means, whereby the second part will generate digital control signals that depend upon the coupling means of first part.

18. A transmitter according to claim 17, wherein said second part includes selector means for selectively altering the functioning of the transmitter, the selector means being hidden by the first part in normal use but being accessible when the first part is removed.

19. A transmitter according to claim 18 wherein the selector means comprises means for selecting an area code to be incorporated into the digital control signal for activating only slave units able to recognise that area code.

20. A transmitter for controlling at least m slave units by generating a digital control signal containing an address for at least one of the slave units and a command for the associated slave unit, the transmitter comprising:
m actuating means by which the generation of said digital control signal can be initiated for selected ones of at least m slave units;
storage means for storing substantially simultaneous actuations of a plurality of said actuating means;
and digital control signal generating means for generating from the storage means a digital control signal comprising one portion containing the addresses of all those selected slave units corresponding to stored actuations and for which a given command has been entered, and a second portion consisting of the given command applicable to those addresses.

21. A transmitter according to claim 20, wherein two different commands can be entered substantially simultaneously by different ones of said actuating means, and comprising means for organising the storage of the substantially simultaneous actuations in the storage means according to the command, and means for accessing the storage means to produce from a group of actuations two digital control signals, one comprising one command with at least one associated address, and the other comprising the other command with at least one associated address.

22. A transmitter for controlling slave units by means of a digital control signal transmitted onto a power main, the transmitter comprising:
  means for inputting an instruction to define said digital control signals;
  means for storing said instruction;
  means for generating, and transmitting onto said power main, said digital control signal corresponding to the stored instruction;
  timing means for delaying the transmission of said digital control signal until the timing means has completed the timing of a given time;
  means for monitoring the power main for detecting digital signals and noise of a given property; and
  means for causing the timing means to recommence its timing when the monitoring means detects signals of said given property, whereby the transmission of said digital control signal is delayed until the main has been free of signals of said given property for said given time.

23. A transmitter according to claim 22, and comprising means for defining said time as a given number of mains half-cycles.

24. A transmitter according to claim 22, wherein the monitoring means is operable to detect frequency range as said given property.

25. A transmitter according to claim 24, wherein the monitoring means comprises means for counting the number of cycles modulated on the main within at least one given time slot in each cycle of the main to determine that the main is free when the count is less than a given value.

26. A transmitter according to claim 22, wherein said at least one time slot substantially coincides with a time slot in which said digital control signal is transmitted relative to the main.

27. A transmitter according to claim 22, wherein the timing means comprises a counter, the causing means is means coupled to the monitoring means for resetting the counter each time said signal or noise of said given property is detected, the transmitter comprising means for causing said counter to count when said digital control signal is ready for transmission, and adjustable means for determining the count to be reached by said counter before transmission occurs, whereby the priority of the transmitter to transmit is determined by said adjustable means.

* * * * *